(12) United States Patent
Fuchikami

(10) Patent No.: US 9,063,843 B2
(45) Date of Patent: Jun. 23, 2015

(54) DATA PROCESSING APPARATUS

(75) Inventor: Takaaki Fuchikami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 91 days.

(21) Appl. No.: 13/491,841

(22) Filed: Jun. 8, 2012

(65) Prior Publication Data

US 2012/0317343 A1 Dec. 13, 2012

(30) Foreign Application Priority Data

Jun. 8, 2011 (JP) ................................ 2011-128607

(51) Int. Cl.
*G06F 12/00* (2006.01)
*G06F 12/02* (2006.01)

(52) U.S. Cl.
CPC .... *G06F 12/0246* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 5,386,552 A * | 1/1995 | Garney | ........................... | 714/10 |
| 5,603,038 A * | 2/1997 | Crump et al. | .................. | 713/310 |
| 6,157,979 A * | 12/2000 | Barnett | ......................... | 710/267 |
| 6,336,174 B1 * | 1/2002 | Li et al. | .......................... | 711/162 |
| 8,019,929 B2 * | 9/2011 | Kimura | ......................... | 711/103 |
| 8,046,635 B2 * | 10/2011 | Kimura | ........................... | 714/24 |
| 8,208,283 B2 * | 6/2012 | Kimura | ......................... | 365/145 |
| 2008/0071972 A1 * | 3/2008 | Kimura | ......................... | 711/103 |
| 2009/0172257 A1 * | 7/2009 | Prins et al. | ..................... | 711/103 |
| 2010/0124094 A1 * | 5/2010 | Kimura | ......................... | 365/145 |
| 2011/0093686 A1 * | 4/2011 | Penton et al. | ................. | 712/222 |

FOREIGN PATENT DOCUMENTS

| | | | | |
|---|---|---|---|---|
| JP | 58-169218 | * 10/1983 | ............... | G06F 1/00 |
| JP | 2004-186874 | * 12/2002 | ............. | H03K 3/356 |
| JP | 2008-210358 | * 9/2008 | ............... | G06F 1/30 |
| JP | 2010-124290 | 6/2010 | | |

OTHER PUBLICATIONS

JP 2004-186874 Takakazu Dec. 2002, AIPN translation.*

* cited by examiner

*Primary Examiner* — Matthew Bradley
*Assistant Examiner* — Francisco Grullon
(74) *Attorney, Agent, or Firm* — Fish & Richardson P.C.

(57) ABSTRACT

A data maintenance device includes: a first storage including volatile storage media; a second storage including nonvolatile storage media; an electronic circuit unit including at least one volatile register; and a selector configured to select one of the first and the second storage to be accessed by the electronic circuit unit. The selector selects the first storage in a state where data processing performed by the electronic circuit unit is ongoing, and the second storage in a state where the data processing is stopped for a shutdown of electric power of the data processing apparatus. The electronic circuit unit stores register data in the storage selected by the selector, the register data being stored in the register at the time when the data processing is stopped for the shutdown.

13 Claims, 13 Drawing Sheets

DATA PROCESSING APPARATUS

CROSS-REFERENCE TO RELATED APPLICATION(S)

This application is based upon and claims the benefit of priority from Japanese Patent Application No. 2011-128607, filed on Jun. 8, 2011, the entire contents of which is incorporated herein by reference.

TECHNICAL FIELD

The present disclosure relates to a data processing apparatus including an electronic circuit unit and, more particularly, to a data processing apparatus configured to record data on a nonvolatile storage medium.

BACKGROUND

In a conventional data processing apparatus, temporary data, e.g., data temporarily stored in a register of an electronic circuit unit, is erased when an electric power of the apparatus is off and cannot be restored even after a power recovery. Accordingly, in the conventional data processing apparatus, such temporary data may need to be backed-up on an external storage, e.g., a magnetic storage medium, during a power shutdown, and restored after a power reactivation.

However, data backup/restoration using an external storage such as a magnetic storage medium requires additional software support. Further, data backup/restoration increases the number of processing steps to be performed when the power is shut down and reactivated, and thus, lengthens the processing time, which may cause stress to a user.

In view of the above, there are disclosed and suggested a data processing apparatus capable of performing a data backup/restoration at the time of an emergency power shutdown without performing a data backup operation during normal operation, and a data maintenance apparatus capable of being appropriately embedded in a device operated by a power supply voltage.

In the above-mentioned data processing or maintenance apparatus, however, it is sometimes necessary to perform a reconstruction of the logical configuration between the electronic circuit unit and the storage medium, e.g., the addition of scan paths. This makes it difficult to apply the above-mentioned apparatus to existing devices. Another problem exists in that the above-mentioned apparatus is disadvantageous in terms of design and manufacturing costs.

As a solution to these problems, it can be considered to record temporary data on a FeRAM (Ferroelectric Random Access Memory). Since FeRAM is a nonvolatile storage medium, data recorded thereon is maintained even when the power is off. However, FeRAM has a longer access time when compared with an ordinary RAM (Random Access Memory), which deteriorates data processing performance during normal operation.

SUMMARY

The present disclosure provides some embodiments of a data processing apparatus configured to perform data processing by an electronic circuit unit having a register, in which a backup/restoration of data stored in the register when the power is shut down and reactivated is allowed by a simple configuration while data processing performance during normal operation is not deteriorated.

According to one embodiment of the present disclosure, there is provided a data processing apparatus including: a first storage including volatile storage media; a second storage including nonvolatile storage media; an electronic circuit unit including at least one volatile register; and a selector configured to select one of the first and the second storage to be accessed by the electronic circuit unit, wherein the selector selects the first storage in a state where data processing performed by the electronic circuit unit is ongoing, and the second storage in a state where the data processing is stopped for a shutdown of electric power of the data processing apparatus, and wherein the electronic circuit unit stores register data in the storage selected by the selector, the register data being stored in the register at the time when the data processing is stopped for the shutdown.

In some embodiments, the selector of the data processing apparatus may be stopped so as to non-volatilely maintain selection information indicative of a selection state at the time when the data processing is stopped for the shutdown, and start in a state indicated by the selection information when the electric power of the data processing apparatus is reactivated.

In some embodiments, the selector of the data processing apparatus may include a nonvolatile logic configured to non-volatilely maintain the selection information, the nonvolatile logic including: a loop unit configured to hold data using a plurality of logic gates connected in a loop shape; a nonvolatile storage unit configured to non-volatilely store the data held by the loop unit by using hysteresis characteristics of ferroelectric elements; and a circuit separator configured to electrically separate the loop unit and the nonvolatile storage unit.

In some embodiments, the electronic circuit unit of the data processing apparatus may perform, when the electric power of the data processing apparatus is reactivated, a restoration process in which the register data stored in the storage selected by the selector is read out therefrom and stored in the register, and the selector may select the first storage when the restoration process is finished.

In some embodiments, the electronic circuit unit of the data processing apparatus may store the register data, which is stored in the register when the restoration process is finished and the first storage is selected by the selector, in the storage selected by the selector.

In some embodiments, the electronic circuit unit of the data processing apparatus may store data stored in a work area of the first storage in the second storage as backup data when the data processing is stopped for the shutdown of the electric power of the data processing apparatus, and read out the backup data from the second storage and store the read-out data in the work area of the first storage when the electric power of the data processing apparatus is reactivated.

In some embodiments, the first storage, the second storage and the electronic circuit unit of the data processing apparatus may be electronically connected with each other by an address bus, and the selector may select one of the first and the second storage to be accessed by the electronic circuit unit by changing address information of the first and the second storage.

In some embodiments, the first storage may include a RAM (Random Access Memory) as the volatile storage media and the second storage may include a FeRAM (Ferroelectric Random Access Memory) as the nonvolatile storage media.

DETAILED DESCRIPTION

Figure 1:
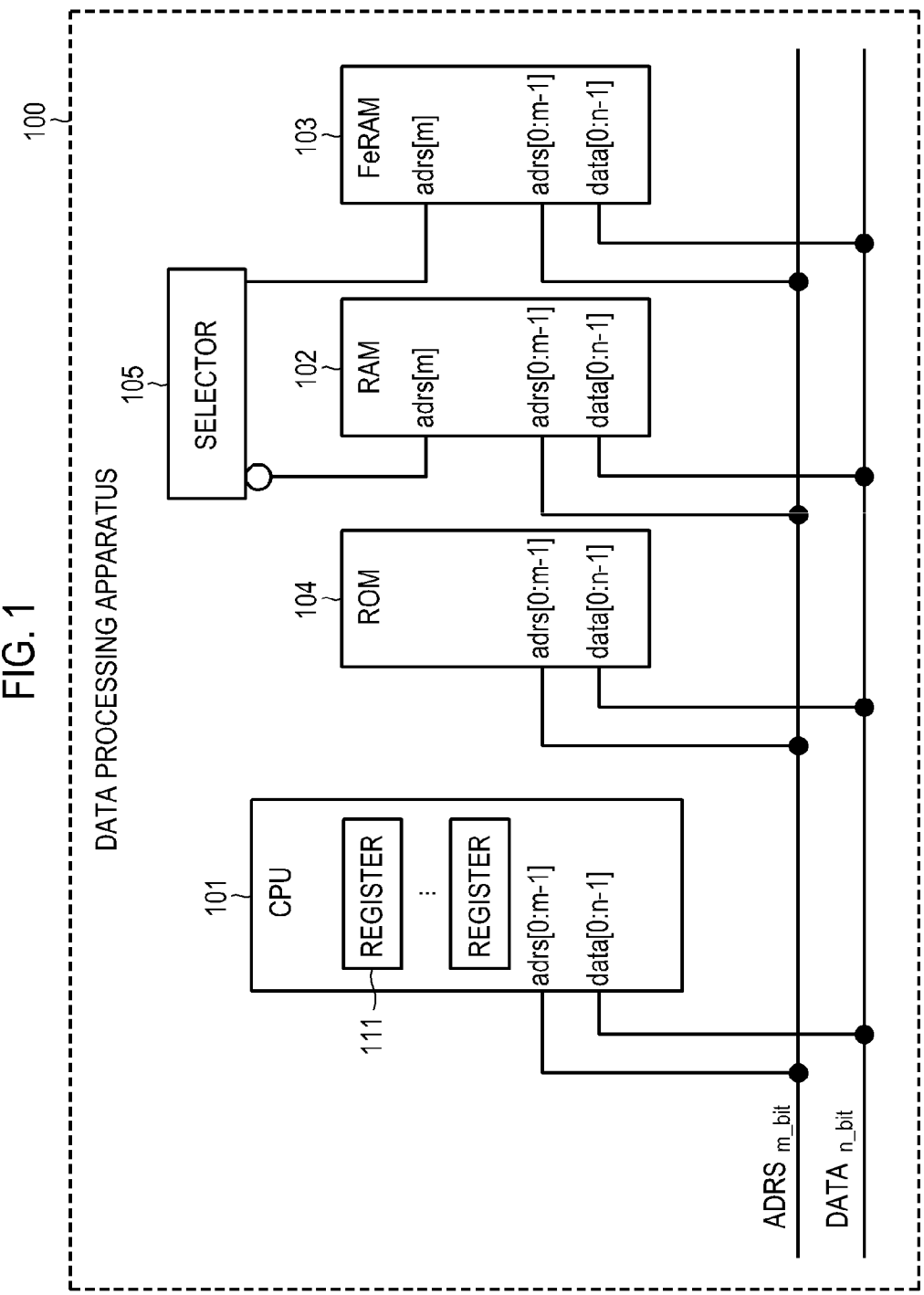
FIG. 1 is a block diagram showing a data processing apparatus according to a first embodiment of the present disclosure.

FIG. 1 is a block diagram showing a data processing apparatus 100 according to a first embodiment of the present disclosure. The data processing apparatus 100 includes a CPU (Central Processing Unit) 101 serving as an electronic circuit unit, a RAM 102 serving as a first storage, a FeRAM 103 serving as a second storage, a ROM (Read Only Memory) 104 and a selector 105.

The CPU 101 is a logical circuit configured to perform data processing, e.g., arithmetic operation, by using a plurality of registers 111.

The registers 111 are volatile storage media and are used as caches in the data processing of the CPU 101. The registers 111 temporarily store therein data processing results, addresses for use in read or write operations of a main memory, e.g., the RAM 102, and operational statuses of respective components of the apparatus 100. The registers 111 may be electrically connected to one another by buses (not shown) and operate in cooperation with one another.

The RAM 102 is a high-speed volatile storage medium used as stack memory for performing stack processes or work memory for temporarily storing processing data.

The FeRAM 103 is a nonvolatile storage medium for storing therein data by using hysteresis characteristics of a ferroelectric material. In the present embodiment, the FeRAM 103 is also used for backup and restoration of register data stored in the registers 111. The FeRAM 103 allows the CPU 101 to continuously preserve the register data even when the power of the data processing apparatus 100 is shut down. The FeRAM 103 inherently has a lower read/write speed than that of the RAM 102.

The ROM 104 is a nonvolatile storage medium for storing therein system programs executed by the CPU 101 and various setting information associated with the operation of the data processing apparatus 100. The ROM 104 may be configured to include a flash EEPROM (Electrically Erasable Programmable Read-Only Memory), which is a rewritable nonvolatile semiconductor memory.

The selector 105 serves to selectively switch the memory accessed by the CPU 101 between the RAM 102 and the FeRAM 103. The selector 105 prevents the CPU 101 from simultaneously accessing the RAM 102 and the FeRAM 103, and allows the CPU 101 to access only one of the RAM 102 and the FeRAM 103 and perform data read/write operations only with respect to the accessed one. The details of the selector 105 will be described later.

The RAM 102, the FeRAM 103 and the ROM 104 are electrically interconnected by an m-bit address bus (ADRS in FIG. 1) and an n-bit data bus (DATA in FIG. 1). The CPU 101 designates an access destination by using m-bit address data (adrs [0: m−1]). The address data adrs input to the RAM 102 and the FeRAM 103 includes not only the above-mentioned m-bit address data (adrs [0:m−1]) transmitted by the CPU 101 but also a single selection bit (adrs [m]) transmitted by the selector 105. The selection bit adrs [m] indicates whether or not the CPU 101 can access the RAM 102 or the FeRAM 103. For example, the RAM 102 (or the FeRAM 103) receives the signal sent from the CPU 101 if adrs [m]=1, and discards the signal sent from the CPU 101 if adrs [m]=0.

Figure 2:
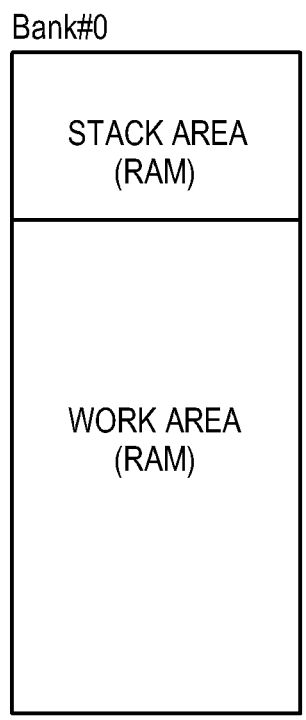
FIG. 2 is a schematic diagram illustrating a conventional memory map.
Figure 3:
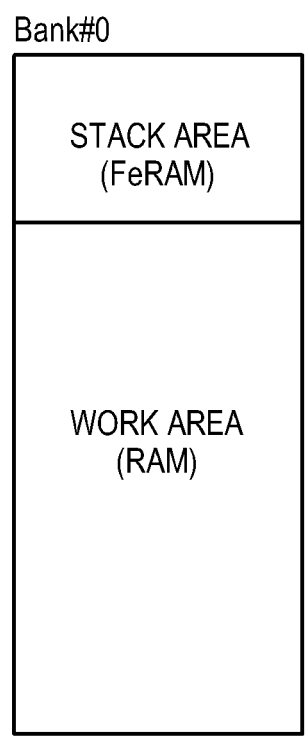
FIG. 3 is a schematic diagram illustrating a memory map of a comparison example of the present disclosure.
Figure 4A:
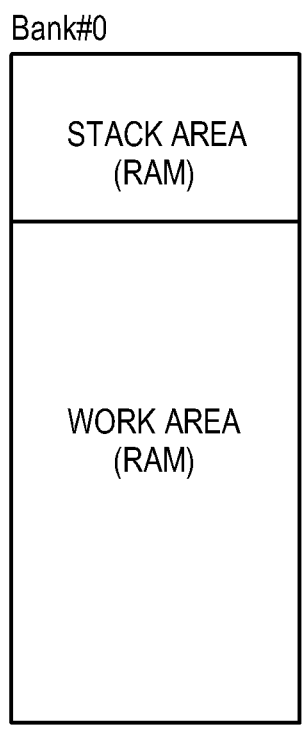
FIGS. 4A and 4B are schematic diagrams illustrating a memory map of one embodiment of the present disclosure.
Figure 4B:
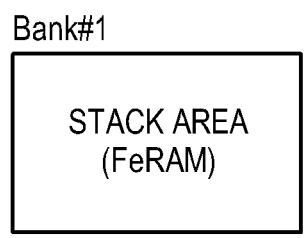

Next, a memory map of the RAM 102 and the FeRAM 103 will be described with reference to FIGS. 2 to 4B. FIG. 2 shows a conventional memory map. FIG. 3 shows a memory map of a comparison example of the present disclosure. FIGS. 4A and 4B show a memory map of one embodiment of the present disclosure.

In the conventional memory map shown in FIG. 2, a stack area for performing stack processes and a work area for temporarily storing processing data are provided in a RAM. The size of the stack area is variable depending on the processing situation of the stack processes. For that reason, the occupying ratio of the stack area in the RAM is not constant.

The stack area is an area where read/write operations of the register data is performed by families of PUSH/POP commands. Examples of use of the stack area are as follows: the current memory address at the time of a subroutine call is stored in the stack area; the memory address is read from the stack area after the subroutine is terminated; and a program counter is stored in the stack area.

However, since the RAM is a volatile storage medium, the data stored in the stack area and the work area is erased upon stopping the electric power supply. The configuration shown in FIG. 3 may be devised to solve this problem.

In the configuration shown in FIG. 3, the work area and the stack area are provided in a RAM and a FeRAM, respectively. Since the FeRAM is a nonvolatile storage medium, data stored in the stack area can be preserved even if the electric power supply is stopped. By pushing register data stored in the registers to the stack area when the power is shut down, data held by a CPU can be preserved.

However, the configuration shown in FIG. 3 has a problem in that performance of the stack processes is degraded during normal operation because FeRAM has a lower write speed than that of RAM.

In view of the above, the present disclosure employs the configuration shown in FIGS. 4A and 4B. FIG. 4A shows a memory map of the RAM 102 and FIG. 4B shows a memory map of the FeRAM 103.

As shown in FIG. 4A, the RAM 102 of the present embodiment has the same configuration as the conventional memory map shown in FIG. 2. As shown in FIG. 4B, the entire area of the FeRAM 103 of the present embodiment forms a stack area. Reference symbols Bank#0 and Bank#1 in FIGS. 4A and 4B indicate the memory bank number.

In the present embodiment, the stack areas are provided in both the RAM 102 and the FeRAM 103 and the CPU 101 is configured to access only one of the RAM 102 and the FeRAM 103 at a time. Selection of the memory to be accessed is performed by the selector 105.

The selector 105 is provided with a nonvolatile logic therein (details of which will be described later). The nonvolatile logic preserves selection information indicative of the selection status of the selector 105 even after the power of the data processing apparatus 100 is shut down. Therefore, if the power is reactivated, the selection status is not initialized and the data processing apparatus 100 is started in the selection status at the time of power shutdown.

Based on the selection information, the selector 105 transmits a binary signal (an output signal Q to be described later) to the RAM 102 and the FeRAM 103, whereby the RAM 102 or the FeRAM 103 is selected and the access target of the CPU 101 is switched.

For example, in the case of selecting the RAM 102, the selector 105 transmits a binary signal having a value of "1" to the RAM 102 while transmitting a binary signal having a logically inverted value, i.e., "0", to the FeRAM 103.

The value indicated by the binary signal transmitted by the selector 105 is stored as the selection bit (adrs [m]) of the address data to be input to the RAM 102 and the FeRAM 103. As described above, each of the RAM 102 and the FeRAM 103 receives the signal sent from the CPU 101 if adrs [m]=1, and discards the signal sent from the CPU 101 if adrs [m]=0. In this manner, the selector 105 performs memory selection.

The selector 105 selects the RAM 102 during normal operation. Accordingly, during normal operation, the CPU 101 performs various kinds of data processing by using the stack area and the work area of the RAM 102.

The selector 105 selects the FeRAM 103 at a time when a power shutdown processing of the data processing apparatus 100 is started and the data processing apparatus 100 is in a ready-to-halt state. Thus, the register data held by the CPU 101 can be stored in the stack area of the FeRAM 103 at the time of power shutdown.

Further, the selector 105 selects the RAM 102 at a time when the power activation processing of the data processing apparatus 100 is started and the register data stored in the FeRAM 103, i.e., the register data backed-up at the previous power shutdown time, is read out by the CPU 101 and stored in the registers 111. Thereafter, data processing is performed by using the RAM 102.

Next, a processing flow of a data backup process at the time of power shutdown will be described with reference to the flowchart shown in FIG. 5.

Figure 5:
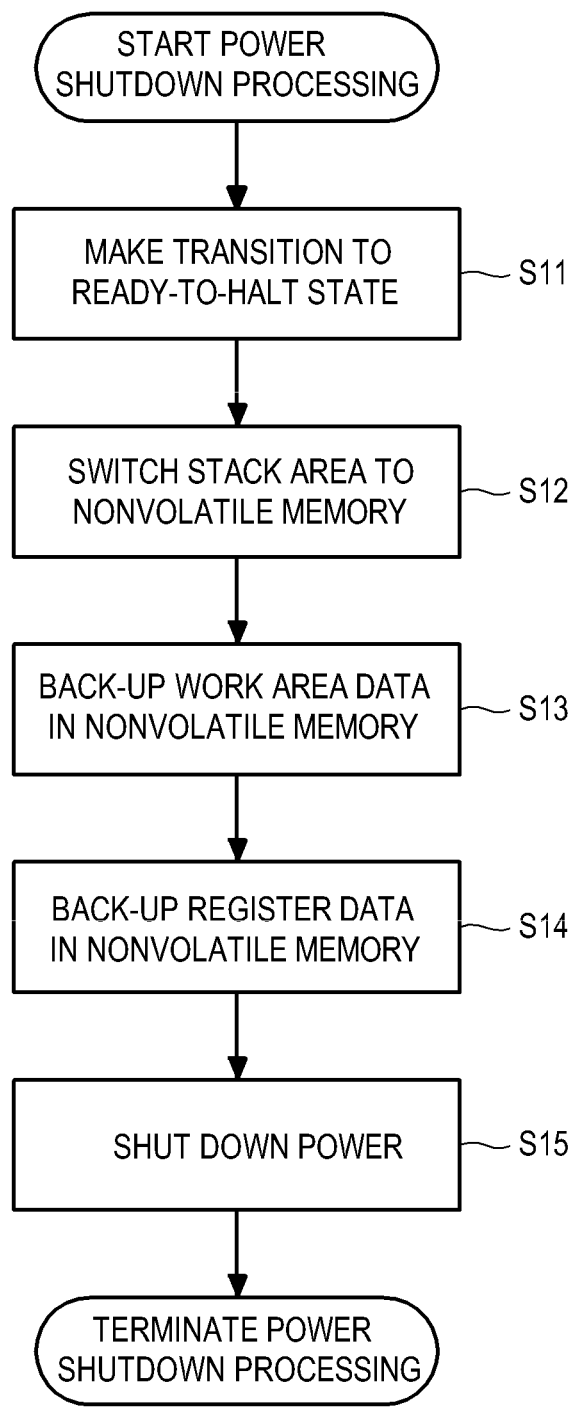
FIG. 5 is a flowchart showing a power shutdown processing according to some embodiments of the present disclosure.

FIG. 5 is a flowchart for explaining the data backup process performed in the data processing apparatus 100. In the process shown in the flowchart, the data processing apparatus 100 is first caused to make a transition to a ready-to-halt state (step S11). More specifically, the data processing apparatus 100 is caused to make a transition to a state in which a machine cycle is terminated and a clock can be stopped.

After the state transition, the selector 105 transmits binary signals to the RAM 102 and the FeRAM 103, thereby switching the access target of the CPU 101 to the FeRAM 103 (step S12). Thus, the stack area is switched to the nonvolatile memory, i.e., the FeRAM 103.

After the switching, the CPU 101 reads out data from the work area of the RAM 102 and records the data on the FeRAM 103 as backup data (step S13). The data read out from the work area can be arbitrarily changed depending on the content of the ongoing data processing. The step S13 can be skipped if it is determined that there is no need to back-up the data of the work area.

The CPU 101 then pushes all of the register data stored in the registers 111 to the stack area of the FeRAM 103, thereby performing a backup of the register data (step S14). After the backup of the register data, the power is shut down and the data processing apparatus 100 is caused to make a transition to a power shutdown state (step S15), thereby terminating the power shutdown processing.

Next, a processing flow of a data restoration process at the time of power activation will be described with reference to the flowchart shown in FIG. 6.

Figure 6:
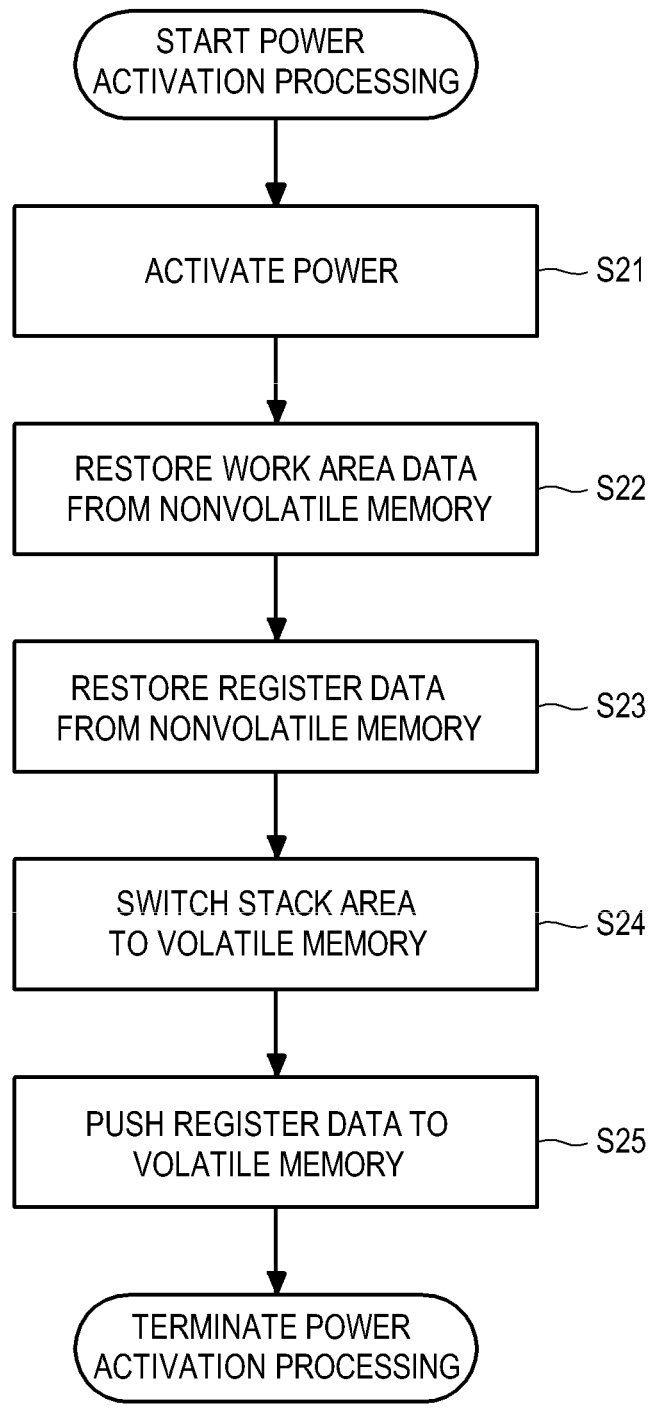
FIG. 6 is a flowchart showing a power activation processing according to some embodiments of the present disclosure.

FIG. 6 is a flowchart for explaining the data restoration process performed in the data processing apparatus 100. In the process shown in the flowchart, a power activation command for the data processing apparatus 100 is first detected and the data processing apparatus 100 is caused to make a transition to an electricity appliance state (step S21).

After the data processing device 100 goes into the electricity appliance state, the CPU 101 reads out the backup data of the work area stored in the FeRAM 103, i.e., the backup data stored in step S13 of FIG. 5, and records the read-out data in the work area of the RAM 102 (step S22). If backup data does not exist in the FeRAM 103 because step S13 of FIG. 5 was skipped, step S22 is also skipped.

Then, the CPU 101 pops the stack area of the memory selected by the selector 105, i.e., the stack area of the FeRAM 103, thereby reading out the data stored in the FeRAM 103. Thus, the register data backed-up at the previous power shutdown time is read out. The register data thus read out is stored in the registers 111 (step S23).

Then, the selector 105 transmits the binary signals to the RAM 102 and the FeRAM 103, thereby switching the access target of the CPU 101 to the RAM 102 (step S24). Thus, the stack area is switched to the volatile memory, i.e., the RAM 102.

Subsequently, the CPU 101 pushes the register data stored in the registers 111, i.e., the register data read out and stored in step S23, to the stack area of the RAM 102 (step S25). From this, the likelihood of data mismatching, which may occur when the data processing stopped at the previous power shutdown time is resumed after the power activation, can be reduced.

After the pushing of the register data to the RAM 102 is finished, ordinary power activation procedures are started and the data restoration process is terminated.

Figure 7:
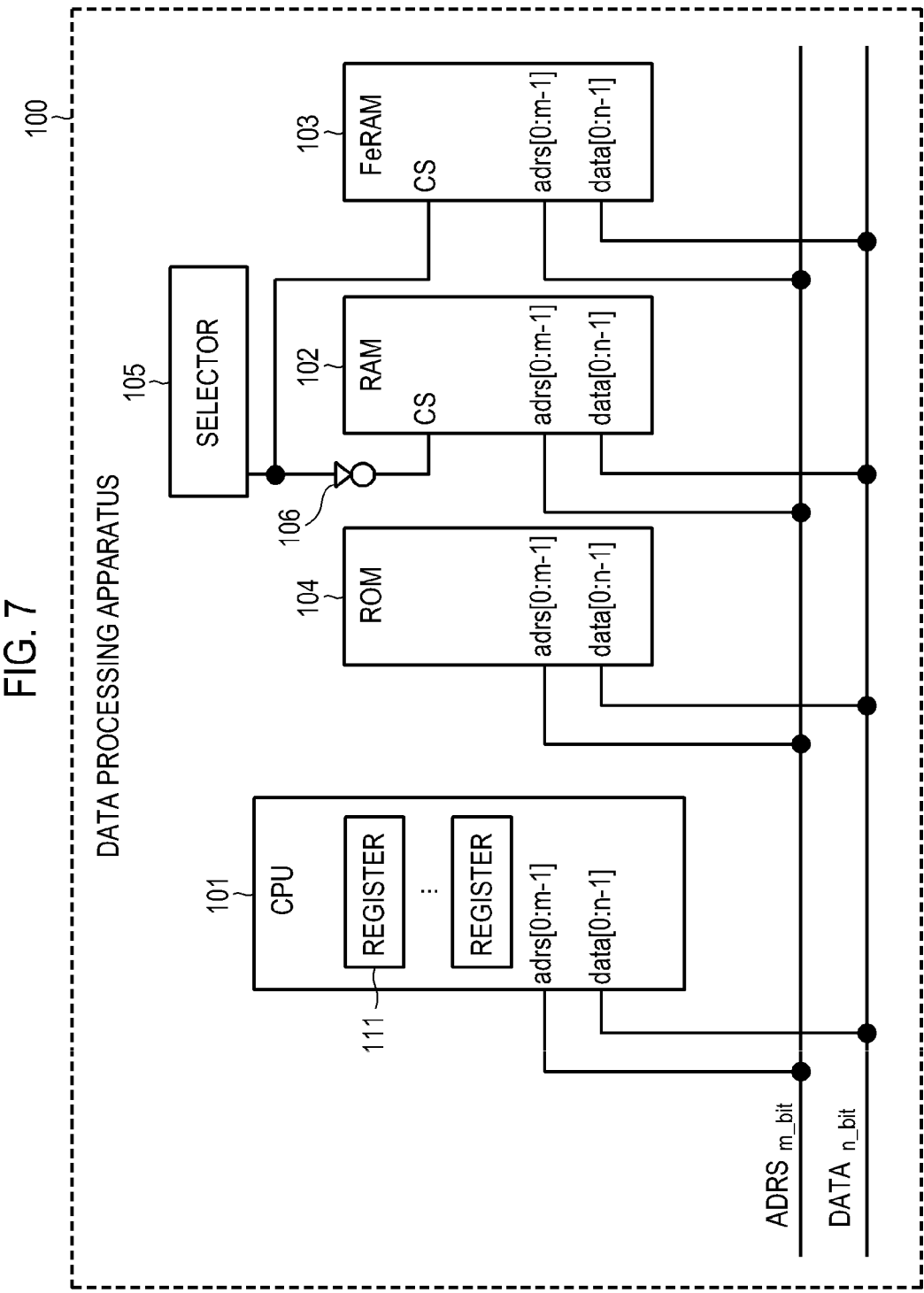
FIG. 7 is a block diagram showing a data processing apparatus according to a second embodiment of the present disclosure.

FIG. 7 is a block diagram showing a data processing apparatus 100 according to a second embodiment of the present disclosure. In the second embodiment shown in FIG. 7, there is provided a single output port through which the selector 105 outputs a binary signal. Further, an inverter 106 is provided on a transfer path of the binary signal.

The binary signal output from the selector 105 is transferred to the FeRAM 103 without being changed, but is transferred to the RAM 102 after being inverted by the inverter 106. For example, if the binary signal output from the selector 105 is "0", a signal value of "0" is transferred to the FeRAM 103 and a signal value of "1" is transferred to the RAM 102. The signal values thus transferred are stored in specific areas of the respective memories (Reference symbols CS in FIG. 7). For example, each of the memories receives the signal sent from the CPU 101 if CS=1, and discards the signal if CS=0.

In the second embodiment, therefore, the selector 105 may output a binary signal having a value of "0" when selecting the RAM 102 and output a binary signal having a value of "1" when selecting the FeRAM 103.

Figure 8:
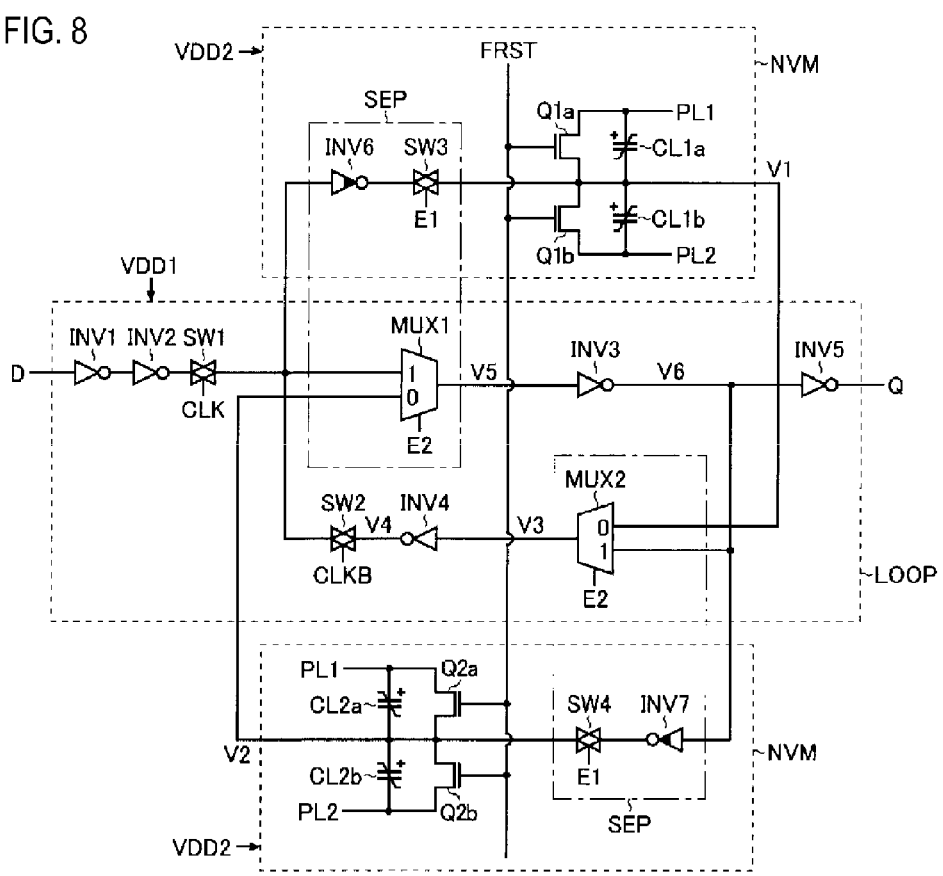
FIG. 8 is a circuit diagram showing one embodiment of a nonvolatile logic.

Next, description will be made on a nonvolatile logic for allowing the selector 105 to maintain a selection status after a power shutdown. FIG. 8 is a circuit diagram showing one embodiment of a nonvolatile logic provided in the selector 105.

As shown in FIG. 8, the nonvolatile logic of the present embodiment is a latch circuit including inverters INV1 to INV7, path switches SW1 to SW4, multiplexers MUX1 and MUX2, N-channel-type field effect transistors Q1a, Q1b, Q2a, and Q2b, and ferroelectric elements (ferroelectric capacitors) CL1a, CL1b, CL2a, and CL2b.

The input terminal of the inverter INV1 is connected to the application terminal of a data signal (D). The output terminal of the inverter INV1 is connected to the input terminal of the inverter INV2. The output terminal of the inverter INV2 is connected to the first input terminal (denoted by "1") of the multiplexer MUX1 via the path switch SW1. The output terminal of the multiplexer MUX1 is connected to the input terminal of the inverter INV3. The output terminal of the inverter INV3 is connected to the input terminal of the inverter INV5.

The output terminal of the inverter INV5 is connected to the extraction terminal of an output signal (Q). The first input terminal (denoted by "1") of the multiplexer MUX2 is also connected to the output terminal of the inverter INV3. The output terminal of the multiplexer MUX2 is connected to the input terminal of the inverter INV4. The output terminal of the inverter INV4 is connected to the first input terminal (denoted by "1") of the multiplexer MUX1 via the path switch SW2.

The nonvolatile logic of the present embodiment includes a loop unit LOOP configured to maintain the input data signal D by using two logic gates, i.e., the inverters INV3 and INV4 in FIG. 8, connected to each other in a loop shape.

The loop unit LOOP is driven by a first power supply voltage VDD1 of, e.g., 0.6 V.

The input terminal of the inverter INV6 is connected to the first input terminal (denoted by "1") of the multiplexer MUX1. The output terminal of the inverter INV6 is connected to a second input terminal (denoted by "0") of the multiplexer MUX2 via the path switch SW3. The input terminal of the inverter INV7 is connected to the first input terminal (denoted by "1") of the multiplexer MUX2. The output terminal of the inverter INV7 is connected to the second input terminal (denoted by "0") of the multiplexer MUX1 via the path switch SW4.

The positive terminal of the ferroelectric element CL1a is connected to a first plate line PL1. The negative terminal of the ferroelectric element CL1a is connected to the second input terminal (denoted by "0") of the multiplexer MUX2. The transistor Q1a is connected between the opposite terminals of the ferroelectric element CL1a. The gate of the transistor Q1a is connected to the application terminal of an F reset signal FRST.

The positive terminal of the ferroelectric element CL1b is connected to the second input terminal (denoted by "0") of the multiplexer MUX2. The negative terminal of the ferroelectric element CL1b is connected to a second plate line PL2. The transistor Q1b is connected between the opposite terminals of the ferroelectric element CL1b. The gate of the transistor Q1b is also connected to the application terminal of the F reset signal FRST.

The positive terminal of the ferroelectric element CL2a is connected to the first plate line PL1. The negative terminal of the ferroelectric element CL2a is connected to the second input terminal (denoted by "0") of the multiplexer MUX1. The transistor Q2a is connected between the opposite terminals of the ferroelectric element CL2a. The gate of the transistor Q2a is also connected to the application terminal of the F reset signal FRST.

The positive terminal of the ferroelectric element CL2b is connected to the second input terminal (denoted by "0") of the multiplexer MUX1. The negative terminal of the ferroelectric element CL2b is connected to the second plate line PL2. The transistor Q2b is connected between the opposite terminals of the ferroelectric element CL2b. The gate of the transistor Q2b is also connected to the application terminal of the F reset signal FRST.

The nonvolatile logic of the present embodiment includes a nonvolatile storage unit NVM configured to non-volatilely store the data signal D held in the loop unit LOOP by using hysteresis characteristics of the ferroelectric elements CL1a, CL1b, CL2a and CL2b.

The nonvolatile storage unit NVM is driven by a second power supply voltage VDD2 of, e.g., 1.2 V, greater than the first power supply voltage VDD1.

Among the components set forth above, the path switch SW1 is turned on and off depending on a clock signal CLK. The path switch SW2 is turned on and off depending on an inverted clock signal CLKB, which is a logically-inverted signal of the clock signal CLK. In other words, the path switches SW1 and SW2 are mutually exclusively (complementarily) turned on and off.

Meanwhile, the path switches SW3 and SW4 are turned on and off depending on a control signal E1, and the signal paths of the multiplexers MUX1 and MUX2 are switched depending on a control signal E2. In the nonvolatile logic of the present embodiment, the multiplexers MUX1 and MUX2, the inverters INV6 and INV7, and the path switches SW3 and SW4 serve as a circuit separator SEP configured to electrically separate the loop unit LOOP and the nonvolatile storage unit NVM.

Among the circuit components forming the circuit separator SEP, the multiplexers MUX1 and MUX2 included in the loop unit LOOP are driven by the first power supply voltage VDD1, while the path switches SW3 and SW4 included in the nonvolatile storage unit NVM are driven by the second power supply voltage VDD2.

Further, the inverters INV6 and INV7 are driven by both the first power supply voltage VDD1 and the second power supply voltage VDD2. The inverters INV6 and INV7 serve as a level shifter configured to change the voltage level of the data signal D transmitted/received between the loop unit LOOP and the nonvolatile storage unit NVM.

Figure 9:
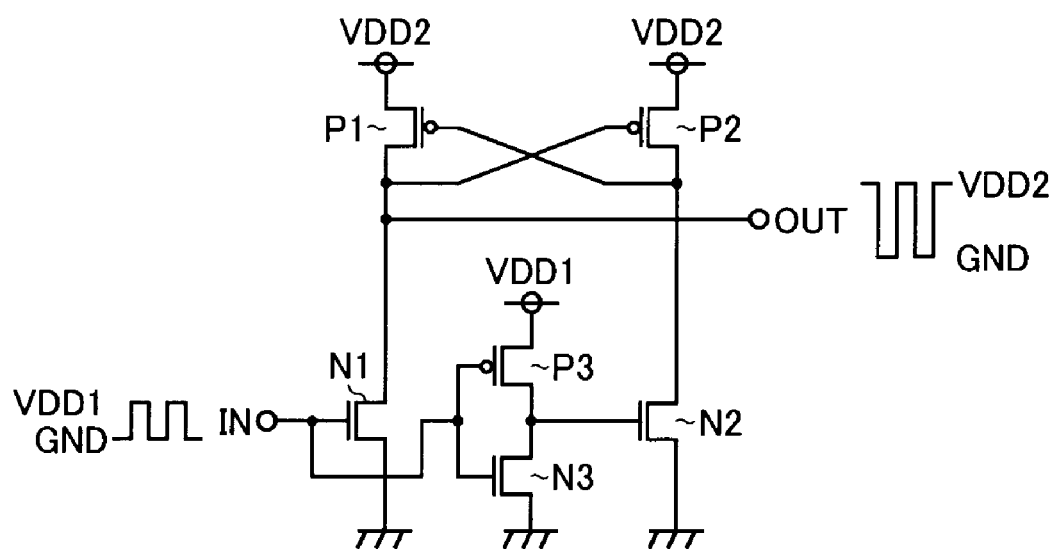
FIG. 9 is a circuit diagram showing one example of a configuration of an inverter having a level shift function.

FIG. 9 is a circuit diagram showing one example of a configuration of the inverter INV6 having a level shift function. The inverter INV7 also may have the same configuration as that shown in FIG. 9.

As shown in FIG. 9, the inverter INV6 (INV7) includes P-channel-type MOS field effect transistors P1 to P3 and N-channel-type MOS field effect transistors N1 to N3. The gate of the transistor N1 is connected to the input terminal IN. The source of the transistor N1 is connected to the ground terminal. The drain of the transistor N1 is connected to the drain of the transistor P1 and the output terminal OUT.

The sources of the transistors P1 and P2 are connected to the application terminal of the second power supply voltage VDD2. The gate of the transistor P1 is connected to the drain of the transistor P2. The gate of the transistor P2 is connected to the drain of the transistor P1. The drain of the transistor P2 is also connected to the drain of the transistor N2. The source of the transistor N2 is connected to the ground terminal. The gates of the transistors P3 and N3 are connected to the input terminal IN.

The source of the transistor P3 is connected to the application terminal of the first power supply voltage VDD1. The drain of the transistor P3 is connected to the drain of the transistor N3 and the gate of the transistor N2. The source of the transistor N3 is connected to the ground terminal.

In the inverter INV6 (INV7) configured as above, if a high-level logical signal, i.e., the first power supply voltage VDD1, is input to the input terminal IN, the transistors N1 and P2 are turned on and the transistors N2 and P1 are turned off. In this case, a low-level logical signal, i.e., a ground voltage GND, is output from the output terminal OUT.

In contrast, if a low-level logical signal, i.e., the ground voltage GND, is input to the input terminal IN, the transistors N1 and P2 are turned off and the transistors N2 and P1 are turned on. In this case, a high-level logical signal, i.e., the second power supply voltage VDD2, is output from the output terminal OUT. That is to say, as shown in FIG. 9, the inverter INV6 (INV7) outputs a logically-inverted signal of the logical signal input to the input terminal IN, the logically-inverted signal having an increased high-level electric potential from the first power supply voltage VDD1 to the second power supply voltage VDD2 when compared with the logical signal input to the input terminal IN.

Next, description will be made on operations of the nonvolatile logic configured as above. In the following description, the node voltages of the respective components will be designated by different reference symbols as follows: reference symbol V1 denotes the voltage appearing on the connection node of the ferroelectric elements CL1a and CL1b; reference symbol V2 denotes the voltage appearing on the connection node of the ferroelectric elements CL2a and CL2b; reference symbol V3 denotes the voltage appearing on the input terminal of the inverter INV4; reference symbol V4 denotes the voltage appearing on the output terminal of the inverter INV4; reference symbol V5 denotes the voltage appearing on the input terminal of the inverter INV3; and reference symbol V6 denotes the voltage appearing on the output terminal of the inverter INV3.

Figure 10:
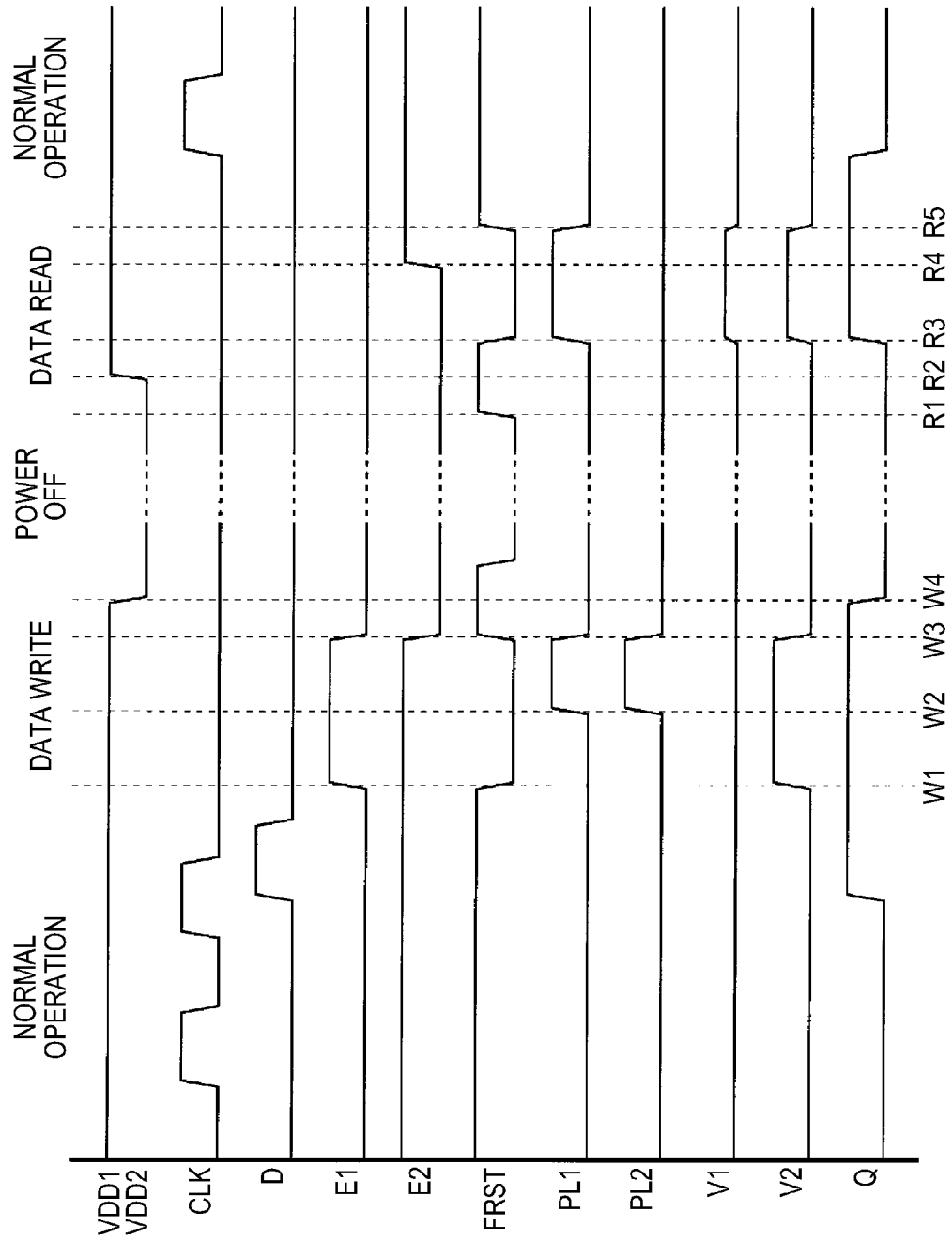
FIG. 10 is a timing chart for explaining an example of operation of a nonvolatile logic.

FIG. 10 is a timing chart for explaining an example of an operation of the nonvolatile logic according to the present disclosure. In the timing chart, the waveforms of the power supply voltages VDD1 and VDD2, the clock signal CLK, the data signal D, the control signal E1, the control signal E2, the F reset signal FRST, the application voltage of the first plate line PL1, the application voltage of the second plate line PL2, the node voltage V1, the node voltage V2, and the output signal Q are shown in the named order from above.

First, description will be made on the normal operation of the nonvolatile logic. Until the time point W1, the F reset signal FRST is kept at "1 (high level: VDD2)". In this case, the transistors Q1a, Q1b, Q2a, and Q2b are turned on and the opposite ends of the ferroelectric elements CL1a, CL1b, CL2a, and CL2b are all short-circuited. Therefore, no voltage is applied to the ferroelectric elements CL1a, CL1b, CL2a, and CL2b. Further, the first plate line PL1 and the second plate line PL2 are all kept at "0 (low level: GND)".

Until the time point W1, the control signal E1 is kept at "0 (GND)" and thus the path switches SW3 and SW4 are kept turned off. Therefore, all the data write drivers, i.e., the inverters INV6 and INV7 in the example shown in FIG. 8, remain invalid.

Furthermore, until the time point W1, the control signal E2 is kept at "1 (VDD1)" and thus the first input terminals (denoted by "1") of the multiplexers MUX1 and MUX2 are selected. Therefore, a normal loop is formed in the loop unit LOOP.

Accordingly, since the path switch SW1 is turned on and the path switch SW2 is turned off during the time when the clock signal CLK is kept at a high level, the data signal D is directly output as the output signal Q. On the other hand, if the path switch SW1 is turned off and the path switch SW2 is turned on during the time when the clock signal CLK is kept at a low level, the data signal D is latched in the falling edge of the clock signal CLK.

Figure 11:
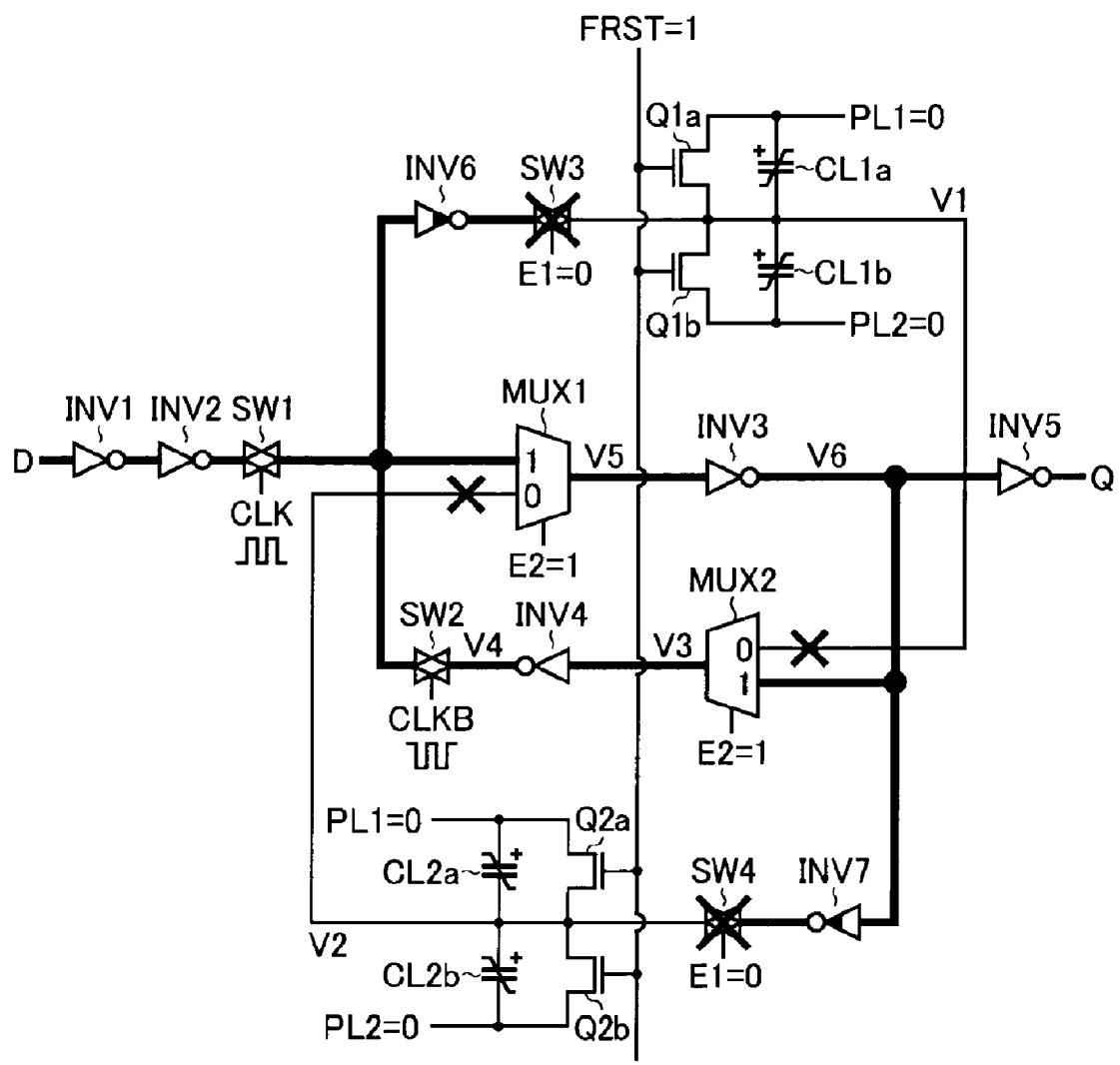
FIG. 11 is a circuit diagram showing a signal path during normal operation.

FIG. 11 is a circuit diagram showing a signal path (depicted by a thick solid line) during normal operation.

Next, description will be made on the data write operation on the ferroelectric elements. During a time period from the time point W1 to the time point W3, the clock signal CLK is kept at "0 (GND)" and the inverted clock signal CLKB is kept at "1 (VDD1)". Thus, the path switch SW1 is turned off and the path switch SW2 is turned on. By fixing the logics of the clock signal CLK and the inverted clock signal CLKB in advance as described above, the stability of the data write operation on the ferroelectric elements can be improved.

Further, during the time period from the time point W1 to the time point W3, the F reset signal FRST is kept at "0 (GND)" and the transistors Q1a, Q1b, Q2a, and Q2b are turned off. Therefore, it becomes possible to apply voltages to the ferroelectric elements CL1a, CL1b, CL2a, and CL2b.

Further, during the time period from the time point W1 to the time point W3, the control signal E1 is kept at "1 (VDD2)" and the path switches SW3 and SW4 are turned on. Therefore, all the data write drivers, i.e., the inverters INV6 and INV7 in the example shown in FIG. 8, become valid.

Further, during the time period from the time point W1 to the time point W3, the control signal E2 is still kept at "1 (VDD1)" and the first input terminals (denoted by "1") of the multiplexers MUX1 and MUX2 are selected. Therefore, a normal loop is formed in the loop unit LOOP.

Meanwhile, during the time period from the time point W1 to the time point W2, the first plate line PL1 and the second plate line PL2 are kept at "0 (GND)", and during the time period from the time point W2 to the time point W3, the first plate line PL1 and the second plate line PL2 are kept at "1 (VDD2)". In other words, the same pulse voltage is applied to the first plate line PL1 and the second plate line PL2. By applying the pulse voltages in the above manner, residual polarization states in the ferroelectric elements are set to be an inverted state or a non-inverted state.

More detailed description will be made with reference to the example shown in FIG. 10. At the time point W1, since the output signal Q is kept at "1 (VDD1)", the node voltage V1 becomes "0 (GND)" and the node voltage V2 becomes "1 (VDD2)". Accordingly, during the period from the time point W1 to the time point W2, where the first plate line PL1 and the second plate line PL2 are kept at "0 (GND)", no voltage is applied between the opposite terminals of the ferroelectric elements CL1a and CL1b. Further, a negative voltage is applied between the opposite terminals of the ferroelectric element CL2a and a positive voltage is applied between the opposite terminals of the ferroelectric element CL2b.

On the other hand, during the period from the time point W2 to the time point W3, where the first plate line PL1 and the second plate line PL2 are kept at "1 (VDD2)", no voltage is applied between the opposite terminals of the ferroelectric elements CL2a and CL2b. Further, a positive voltage is applied between the opposite terminals of the ferroelectric element CL1a and a negative voltage is applied between the opposite terminals of the ferroelectric element CL1b.

By applying the pulse voltages to the first plate line PL1 and the second plate line PL2 in the above manner, the residual polarization states in the ferroelectric element are set to be an inverted state or a non-inverted state. At this time, the residual polarization states are reversed between the ferroelectric elements CL1a and CL1b and between the ferroelectric elements CL2a and CL2b. Similarly, the residual polarization states are reversed between the ferroelectric elements CL1a and CL2a and between the ferroelectric elements CL1b and CL2b.

At the time point W3, the F reset signal FRST returns to "1 (VDD2)", whereby the transistors Q1a, Q1b, Q2a, and Q2b are turned on and the opposite terminals of the ferroelectric elements CL1a, CL1b, CL2a, and CL2b are all short-circuited. Therefore, no voltage is applied to the ferroelectric elements CL1a, CL1b, CL2a, and CL2b. At this time, the first plate line PL1 and the second plate line PL2 are all kept at "0 (GND)".

Further, at the time point W3, the control signal E1 returns to "0 (GND)" and the path switches SW3 and SW4 are turned off. Therefore, all the data write drivers, i.e., the inverters INV6 and INV7 in the example shown in FIG. 8, become invalid. Meanwhile, though the control signal E2 is kept at "0 (GND)" in the example shown in FIG. 10, the value of the control signal E2 does not matter.

At the time point W4, the supply of both the first power supply voltage VDD1 to the loop unit LOOP and the second power supply voltage VDD2 to the nonvolatile storage unit NVM are stopped. At this time, the F reset signal FRST is still kept at "1 (VDD2)" after the time point W3. Therefore, the transistors Q1a, Q1b, Q2a, and Q2b are turned on and the opposite terminals of the ferroelectric elements CL1a, CL1b, CL2a, and CL2b are all short-circuited.

Since no voltage is applied to the ferroelectric elements CL1a, CL1b, CL2a, and CL2b, even if voltages are changed at the time of power shutdown, unintentional voltages applied to the ferroelectric elements CL1a, CL1b, CL2a, and CL2b can be prevented. Accordingly, data corruption can be avoided.

Figure 12:
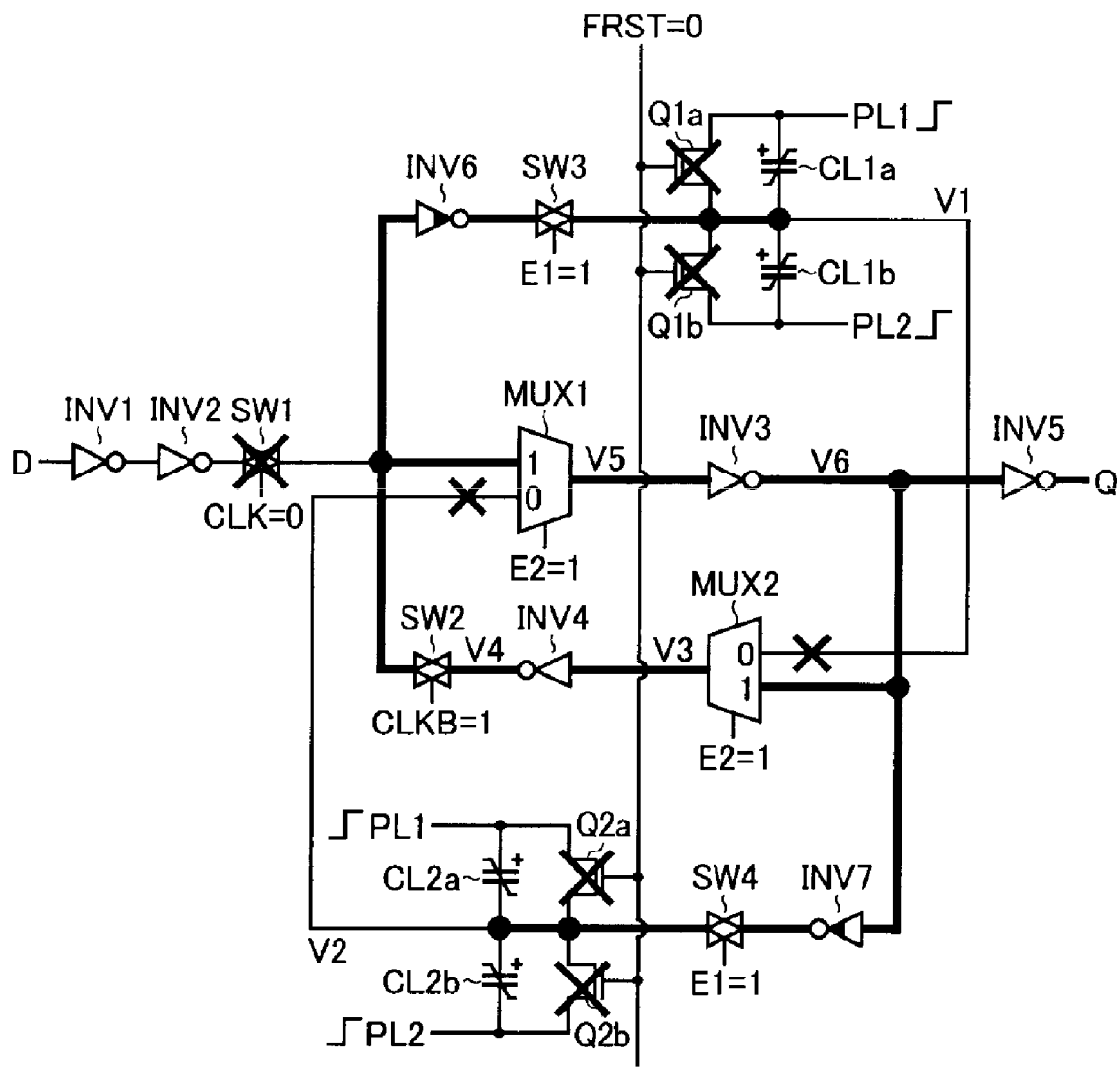
FIG. 12 is a circuit diagram showing a signal path during a data write operation.

FIG. 12 is a circuit diagram showing a signal path (indicated by a thick solid line) during the data write operation (particularly, from the time point W1 to the time point W3).

Next, description will be made on the data read operation from the ferroelectric elements. During the time period from the time point R1 to the time point R5, the clock signal CLK is kept at "0 (GND)" and the inverted clock signal CLKB is kept at "1 (VDD1)". Accordingly, the path switch SW1 is turned off and the path switch SW2 is turned on. By fixing the logics of the clock signal CLK and the inverted clock signal CLKB in advance as described above, the stability of the data read operation from the ferroelectric elements can be improved.

At the time point R1, the F reset signal FRST becomes "1 (VDD1)". Therefore, the transistors Q1a, Q1b, Q2a, and Q2b are turned on and the opposite terminals of the ferroelectric elements CL1a, CL1b, CL2a, and CL2b are all short-circuited. Since no voltage is applied to the ferroelectric elements CL1a, CL1b, CL2a, and CL2b, even if voltages are changed at the time of power activation, unintentional voltages applied to the ferroelectric elements CL1a, CL1b, CL2a, and CL2b can be prevented. Accordingly, data corruption can be avoided.

Further, at the time point R1, the first plate line PL1 and the second plate line PL2 are both kept at "0 (low level: GND)".

Figure 13:
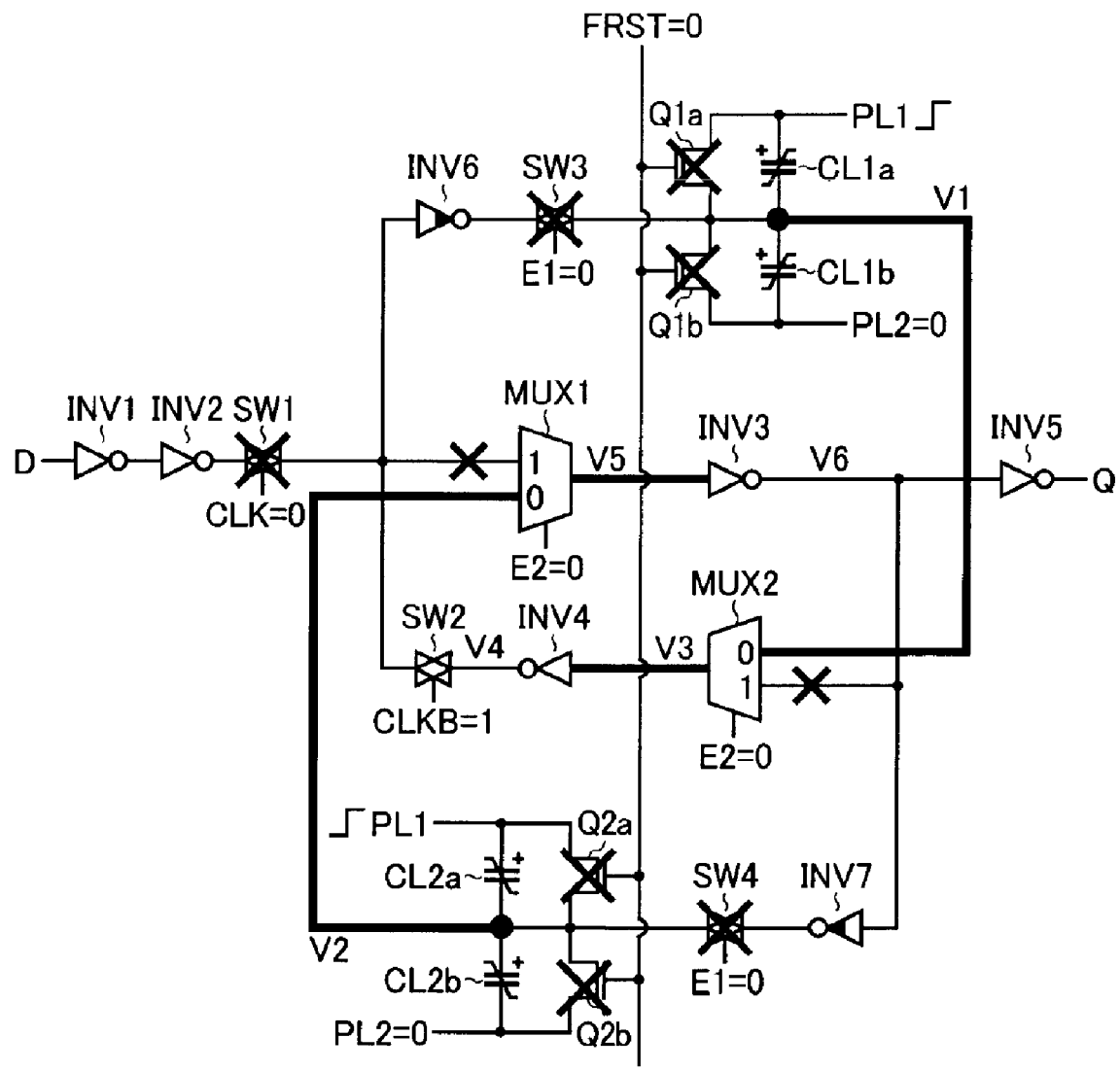
FIG. 13 is a circuit diagram showing a signal path during a data read operation.

At the time point R2, the first power supply voltage VDD1 and the second power supply voltage VDD2 are applied to the loop unit LOOP and the nonvolatile storage unit NVM, respectively, under a state where the control signals E1 and E2 are kept at "0 (GND)" (i.e., under a state where the data write drivers become invalid and the normal loop in the loop unit LOOP becomes invalid). At this time, the signal line depicted by a thick solid line in FIG. 13 is in a floating state.

At the time point R3, the F reset signal FRST becomes "0 (GND)" and the transistors Q1a, Q1b, Q2a, and Q2b are turned off. Thus, voltage application to the ferroelectric elements CL1a, CL1b, CL2a, and CL2b can be made. On the other hand, the second plate line PL2 is kept at "0 (GND)" and the first plate line PL1 is kept at "1 (VDD2)". By applying the pulse voltages in this manner, voltage signals corresponding to the residual polarization states in the ferroelectric elements appear as the node voltages V1 and V2.

More detailed description will be made with reference to the example shown in FIG. 10. A relatively low voltage signal (hereinafter, referred to as WL [Weak Low]) appears as the node voltage V1 while a relatively high voltage signal (hereinafter, referred to as WH [Weak Hi]) appears as the node voltage V2. That is to say, a voltage difference corresponding to the difference in the residual polarization states between the ferroelectric elements is generated between the node voltages V1 and V2.

During the time period from the time point R3 to the time point R4, the control signal E2 becomes "1 (VDD1)" and the second input terminals (denoted by "0") of the multiplexers MUX1 and MUX2 are selected. Therefore, the logic of the node voltage V3 becomes WL and the logic of the node voltage V4 becomes WH. Further, the logic of the node voltage V5 becomes WH and the logic of the node voltage V6 becomes WL. As such, during the time period from the time point R3 to the time point R4, the node voltages V1 to V6 of the respective components are still in an unstable state, i.e., in a state where inverting operations at the inverters INV3 and INV4 are not fully carried out and thus the output logics thereof do not definitely become "0 (GND)" or "1 (VDD1)".

Subsequently, at the time point R4, the control signal E2 becomes "1 (VDD1)" and the first input terminals (denoted by "1") of the multiplexers MUX1 and MUX2 are selected. Thus, a normal loop is formed in the loop unit LOOP. Along with the above-mentioned switching of the signal path, the output terminal of the inverter INV4 having a logic WH and the input terminal of the inverter INV3 having a logic WH are connected to each other, and the output terminal of the inverter INV3 having a logic WL and the input terminal of the inverter INV4 having a logic WL are connected to each other.

Accordingly, no mismatching occurs in the signal logics (WH/WL) of the respective nodes. While the normal loop is formed in the loop unit LOOP, the inverter INV4 receives the logic WL and attempts to raise the output logic thereof to "1 (VDD1)". Further, the inverter INV3 receives the logic WH and attempts to lower the output logic thereof to "0 (GND)". As a result, the output logic of the inverter INV3 is changed from the unstable logic WL to "0 (GND)", and the output logic of the inverter INV4 is changed from the unstable logic WH to "1 (VDD1)".

As such, at the time point R4, the loop unit LOOP forms a normal loop and the signal read out from the ferroelectric elements (the electric potential difference between the node voltages V1 and V2) is amplified in the loop unit LOOP, thereby restoring the data held before the power shutdown ("1 (VDD1)" in the example shown in FIG. 9) as the output signal Q.

Thereafter, at the time point R5, the F reset signal FRST returns to "1 (VDD2)", whereby the transistors Q1a, Q1b, Q2a, and Q2b are turned on and the opposite terminals of the ferroelectric elements CL1a, CL1b, CL2a, and CL2b are all short-circuited. Therefore, no voltage is applied to the ferroelectric elements CL1a, CL1b, CL2a, and CL2b. At this time, the first plate line PL1 and the second plate line PL2 are both kept at "0 (GND)". Accordingly, the nonvolatile logic returns to the state before the time point W1, i.e., the normal operation state.

FIG. 13 is a circuit diagram showing a signal path (indicated by a thick solid line) during the data read operation (particularly, from the time point R3 to the time point R4).

According to the above-described embodiments, the RAM 102 (Bank #0) is selected during normal operation, thereby maintaining data processing performance. Meanwhile, when the power shutdown processing is started to proceed toward a suspended state, the FeRAM 103 (Bank #1) is selected to back-up the register data. At the time of power activation, the backed-up register data is read out from the FeRAM 103, and the RAM 102 is selected to proceed toward the normal data processing.

Accordingly, the register data can be backed-up at the time of power shutdown and restored at the time of power activation by employing a simple configuration in which the FeRAM 103 and the selector 105 are added to an existing device. Further, the data processing performance is not deteriorated because data processing during normal operation is performed by using the RAM 102.

OTHER MODIFIED EXAMPLE

In addition to the embodiments described above, the configuration of the present disclosure can be modified in many different forms without departing from the scope of the present disclosure. In other words, it should be appreciated that the foregoing embodiments are not limitative but illustrative in every respect. The technical scope of the present disclosure is not determined by the foregoing embodiments but by the claims, and should be construed to include all modifications equivalent in meaning and scope to the claims.

In the embodiments described above, the address data, in particular, the selection bits (adrs [m]), are controlled by two system outputs of the selector 105 (see FIG. 1), and the CS values are controlled by one system output of the selector 105 together with the inverter 106 (see FIG. 7). However, the combination of output systems and control targets is not limited thereto, but may be modified without departing from the scope of the present disclosure. For example, the CS values may be controlled by two system outputs of the selector 105, or the selection bits (adrs [m]) may be controlled by one system output of the selector 105 together with the inverter 106.

The embodiments of the present disclosure may be applied in improving the convenience of a microprocessor, an image processor, a multimedia processor, an IP core, a personal computer, a network server, a mobile device, a game machine, a PDA, etc.

According to the embodiments of the present disclosure, data backup and restoration is performed in such a way that the selector switches the storage to be accessed by the electronic circuit unit depending on the status of the data processing apparatus. Therefore, data backup and restoration for the data stored in the register provided in the electronic circuit unit can be performed with a simple configuration. In addition, since the nonvolatile FeRAM is used only for the data backup and restoration, while the volatile RAM is used during normal operation, deterioration of the data processing performance can be prevented.

While certain embodiments have been described, these embodiments have been presented by way of example only, and are not intended to limit the scope of the disclosures. Indeed, the novel devices described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A data processing apparatus, comprising:
   a first storage including volatile storage media having a first stack area and a work area;
   a second storage including nonvolatile storage media having a second stack area;
   an electronic circuit unit including at least one volatile register;
   a selector having an output port, and arranged to transmit binary signals through the output port to the first storage and the second storage based on selection information indicating a selection for one of the first storage or the second storage for the electronic circuit unit to perform read/write operations exclusively on the selected storage; and
   an inverter arranged between the selector and the first storage, and configured to invert binary signals transmitting to the first storage,
   wherein the selector selects the first storage in a state where data processing performed by the electronic circuit unit is ongoing, and selects the second storage in a state where the data processing is stopped for a shutdown of an electric power of the data processing apparatus, and
   wherein the electronic circuit unit stores register data, which is stored in the at least one volatile register, in the stack area of the second storage when the data processing is stopped for the shutdown.

2. The apparatus of claim 1, wherein the selector is stopped so as to non-volatilely maintain the selection information indicative of a selection state at the time when the data processing is stopped for the shutdown, and start in a state indicated by the selection information when the electric power of the data processing apparatus is reactivated.

3. The apparatus of claim 2, wherein the selector includes a nonvolatile logic configured to non-volatilely maintain the selection information, the nonvolatile logic including:
   a loop unit configured to hold data using a plurality of logic gates connected in a loop shape;
   a nonvolatile storage unit configured to non-volatilely store the data held by the loop unit by using hysteresis characteristics of ferroelectric elements; and
   a circuit separator configured to electrically separate the loop unit and the nonvolatile storage unit.

4. The apparatus of claim 3, wherein the electronic circuit unit performs, when the electric power of the data processing apparatus is reactivated, a restoration process in which the register data stored in the storage selected by the selector is read out therefrom and stored in the register, and wherein the selector selects the first storage when the restoration process is finished.

5. The apparatus of claim 4, wherein the electronic circuit unit stores the register data, which is stored in the register when the restoration process is finished and the first storage is selected by the selector, in the storage selected by the selector.

6. The apparatus of claim 5, wherein the electronic circuit unit stores data stored in the work area of the first storage in the second storage as backup data when the data processing is stopped for the shutdown of the electric power of the data processing apparatus, and reads out the backup data from the second storage and store the read-out data in the work area of the first storage when the electric power of the data processing apparatus is reactivated.

7. The apparatus of claim 6, wherein the first storage, the second storage, and the electronic circuit unit are electronically connected with each other by an address bus, and wherein the selector selects one of the first and the second storage to be accessed by the electronic circuit unit by changing address information of the first and the second storage.

8. The apparatus of claim 7, wherein the first storage includes a RAM (Random Access Memory) as the volatile storage media and the second storage includes a FeRAM (Ferroelectric Random Access Memory) as the nonvolatile storage media.

9. The apparatus of claim 1, wherein the first storage, the second storage, and the electronic circuit unit are electronically connected with each other by a data bus.

10. The apparatus of claim 9, wherein the electronic circuit unit stores register data through the data bus in the storage selected by the selector, the register data being stored in the register at the time when the data processing is stopped for the shutdown.

11. The apparatus of claim 1, wherein the storage not selected by the selector discards the register data sent from the electronic circuit unit.

12. The apparatus of claim 1, wherein the binary signal from the selector prevents a processing unit from simultaneously performing the read/write operations on both the first storage and the second storage.

13. The apparatus of claim 1, wherein the binary signal from the selector allows a processing unit to access only one of the first storage or the second storage at a time, and to perform the data read/write operations only with respect to the selected storage.

* * * * *